(12) United States Patent
Cook et al.

(10) Patent No.: US 8,729,734 B2
(45) Date of Patent: May 20, 2014

(54) WIRELESS POWER BRIDGE

(75) Inventors: Nigel P. Cook, El Cajon, CA (US); Lukas Sieber, Olten (CH); Hanspeter Widmer, Wohlenschwil (CH)

(73) Assignee: QUALCOMM Incorporated, San Diego, CA (US)

( * ) Notice: Subject to any disclaimer, the term of this patent is extended or adjusted under 35 U.S.C. 154(b) by 273 days.

(21) Appl. No.: 12/040,783

(22) Filed: Feb. 29, 2008

(65) Prior Publication Data
US 2009/0127937 A1    May 21, 2009

Related U.S. Application Data

(60) Provisional application No. 60/988,758, filed on Nov. 16, 2007.

(51) Int. Cl.
*H01F 27/42*    (2006.01)

(52) U.S. Cl.
USPC .......................................... 307/104

(58) Field of Classification Search
USPC .......................................... 307/104; 320/108
See application file for complete search history.

(56) References Cited

U.S. PATENT DOCUMENTS

| | | | |
|---|---|---|---|
| 2,133,494 A | 10/1938 | Waters | |
| 5,428,521 A | 6/1995 | Kigawa et al. | |
| 6,430,064 B1 | 8/2002 | Tsuchimoto et al. | |
| 7,076,206 B2 | 7/2006 | Elferich et al. | |
| 7,667,352 B2 * | 2/2010 | Drechsler et al. | 307/104 |
| 7,675,197 B2 * | 3/2010 | Tetlow | 307/104 |
| 7,728,551 B2 * | 6/2010 | Reed et al. | 320/108 |
| 7,741,734 B2 | 6/2010 | Joannopoulos et al. | |
| 7,825,543 B2 | 11/2010 | Karalis et al. | |
| 2005/0127867 A1 | 6/2005 | Calhoon et al. | 320/108 |
| 2005/0127869 A1 | 6/2005 | Calhoon et al. | |
| 2005/0131495 A1 | 6/2005 | Parramon et al. | 607/61 |
| 2007/0222542 A1 | 9/2007 | Joannopoulos | |
| 2008/0061778 A1 * | 3/2008 | Takahashi et al. | 324/307 |
| 2008/0067874 A1 * | 3/2008 | Tseng | 307/104 |
| 2008/0191897 A1 | 8/2008 | McCollough | 340/625.22 |
| 2008/0245422 A1 * | 10/2008 | McTargett | 137/487.5 |
| 2009/0157145 A1 * | 6/2009 | Cauller | 607/60 |
| 2010/0072825 A1 * | 3/2010 | Azancot et al. | 307/104 |
| 2010/0181841 A1 | 7/2010 | Azancot et al. | |

FOREIGN PATENT DOCUMENTS

| | | |
|---|---|---|
| CN | 1950914 A | 4/2007 |
| JP | 3212134 A | 9/1991 |
| JP | H06178464 A | 6/1994 |
| JP | 10208804 A | 8/1998 |
| JP | 11188113 A | 7/1999 |
| JP | 11338983 A | 12/1999 |

(Continued)

OTHER PUBLICATIONS

J. Schutz et al., "Load Adaptive Medium Frequency Resonant Power Supply", IEEE, Feb. 2002 pp. 1-6.*

(Continued)

*Primary Examiner* — Rexford Barnie
*Assistant Examiner* — Joseph Inge
(74) *Attorney, Agent, or Firm* — Knobbe Martens Olson & Bear LLP (57) ABSTRACT

A wireless power bridge that allows magnetic transmission of energy across a solid barrier such as a wall. A circuit is described for controlling the operation.

48 Claims, 4 Drawing Sheets

(56) References Cited

FOREIGN PATENT DOCUMENTS

| | | |
|---|---|---|
| JP | 2000134830 A | 5/2000 |
| JP | 2001238372 A | 8/2001 |
| JP | 2001309579 A | 11/2001 |
| JP | 2002078247 A | 3/2002 |
| JP | 2002325457 A | 11/2002 |
| JP | 2004153879 A | 5/2004 |
| JP | 2004194444 A | 7/2004 |
| JP | 2006102055 A | 4/2006 |
| JP | 2006136045 | 5/2006 |
| JP | 2006517778 A | 7/2006 |
| JP | 2007206776 A | 8/2007 |
| JP | 2007228794 A | 9/2007 |
| KR | 19980703719 | 12/1998 |
| WO | WO2006101614 | 9/2006 |
| WO | WO2007084716 | 7/2007 |
| WO | WO2007095267 | 8/2007 |

OTHER PUBLICATIONS

International Search Report and Written Opinion—PCT/US2008/083723, International Search Authority—European Patent Office—Jun. 22, 2009.

Jonathan Fildes., "Physics promises wireless power", BBC News, http://users.erols.com/iri/EnewsDec9,2006.htm or http://news.bbc.co.uk/2/hi/technology/6129460.stm, Nov. 15, 2006.

"Wireless Non-Radiative Energy Transfer", MIT paper, publication and date unknown, believed to be 2007.

"Efficient wireless non-radiative mid-range energy transfer", MITpaper, publication and date unknown, believed to be 2007.

"Wireless Power Transfer via Strongly Coupled Magnetic Resonances", Kurs et al, Science Express, Jun. 7, 2007.

"Wireless Power Transfer via Strongly Coupled Magnetic Resonances", Kurs et al, scimag.org, Jul. 6, 2007.

* cited by examiner

WIRELESS POWER BRIDGE

This application claims priority from provisional application No. 60/988,758, filed Nov. 16, 2007, the disclosure of which is herewith incorporated by reference.

BACKGROUND

It is often desirable to provide electric power to an area that is separated from the main powered areas by a wall or window. The wall or window makes the use of an extension cord less practical to provide this power. For example, an extension cord might require that a window or door be left open to allow the cord to pass therethrough.

For example, it may be convenient to use a laptop PC on the balcony or terrace where there is no electrical socket. It may be useful to put sensors on the outside of a house, for example to power a burglar alarm or television monitor. It may be desirable to bring a television outdoors.

One way to do this is to wire the new area; to drill a hole through a wall for example. However, this may not be allowed, for example in a rental apartment or condo. It may be cost prohibitive and/or inconvenient. Or, the user simply might not want to do it.

SUMMARY

The present application describes a wireless power bridge that allows directing power wirelessly through a solid blocking element, e.g., a solid wall or a closed window.

Power is applied to one side of the element that is near a source of AC power. That power is wirelessly transmitted through a first tuned antenna, to a second tuned antenna. The second antenna is capable of being separated from the first antenna by a solid object. The second antenna receives the power and provides a power outlet.

The wireless power bridge may provide a power outlet for AC power, or DC power.

In an embodiment, a transmitting subsystem produces a local power hotspot that extends across a solid object, and in which wireless power can be received. The wireless power is received by a receiver on the other side of that local power hotspot.

BRIEF DESCRIPTION OF THE DRAWINGS

These and other aspects will now be described in detail with reference to the accompanying drawings, wherein.

DETAILED DESCRIPTION

Figure 1:
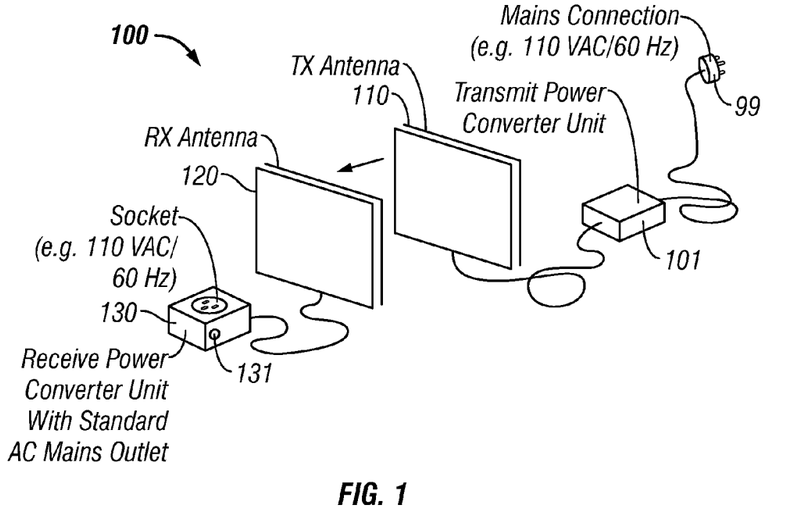
FIG. 1 shows a possible arrangement of the system using a low voltage DC output.

FIG. 1 illustrates an embodiment of a wireless power bridge. In this embodiment, the power output is an AC power output, for example producing a standard 110 VAC/60 Hz power Another embodiment may produce different voltage output, for example, 208 V or any other standard AC voltage.

The embodiment produces power on a transmit side 100 by attaching via a wire to the standard AC power source. The power is coupled to a transmitting antenna 110, which is wirelessly sent via magnetic field coupling to a receiving antenna 120.

The preferred embodiment of a wireless power bridge is based on coupled resonance. Thus transmit and receiving antennas are preferably resonant antennas, which are substantially resonant, e.g., resonance frequency within a fractional bandwidth of 10%, 15%, or 20% of operating frequency. The operation and formation of the antennas may be as described in U.S. patent application Ser. No. 12/018,069, filed Jan. 22, 2008, entitled "Wireless Apparatus and Methods", the disclosure of which is herewith incorporated by reference.

The transmission is preferably a substantially non-modulated carrier frequency greater than or equal to 50 Hz. For example, the preferred frequency may be between 20 kHz and 135 kHz.

Another embodiment may use a much lower frequency. For example the standard AC power frequency of 60 Hz may be usable for wireless transfer.

An embodiment may create a near field in the area of the transmitter that stores energy magnetically in its near field, and the receiving antenna which removes energy from that near field.

The embodiment in FIG. 1 allows power transfer through an essentially nonmetallic wall. The size of the antenna, in turn, sets the thickness of the wall through which the power can be transmitted. For example, the wall may be as thin as a few millimeters, or as thick as 40 cm (16 inches).

Figure 2:
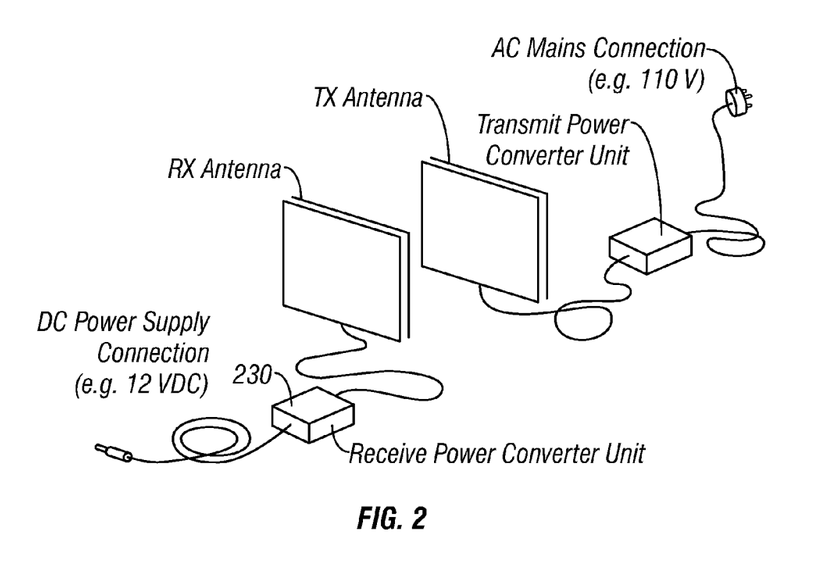
FIG. 2 shows a possible arrangement of a system using a standard AC voltage output (e.g. 110 VAC/60 Hz)

The efficiency and amount of power transfer also depends on the size of the antenna. In a system based on coupled resonance, the antennas are resonant antennas and typically have a high Q factor, for example a Q factor greater than 200. With appropriately dimensioned elements, and using the techniques described herein, a power transfer through the output socket 130 or DC jack 232 of for example 100 W may be obtainable.

The embodiment uses an AC cord 99 to connect to the standard AC power, for example 110 V AC/60 Hz or 220 V AC/50 Hz. The power is coupled to a transmit power converter 101. Converter 101 converts the standard AC voltage and frequency into another voltage and another frequency; typically up converting frequency to a frequency value greater than 50 Hz. This higher frequency may be more appropriate to use for magnetically coupled wireless transmission.

In an alternative embodiment, as discussed above, the standard AC power frequency of 50 or 60 Hz may also be used for wireless power transmission.

The transmit antenna 110 is preferably a flat-panel antenna that is substantially resonant with the operating frequency produced by the converter unit 101. The receiving antenna 120 is preferably also a flat-panel unit that uses an inductive loop, e.g. a single or multiple turn inductor, and a capacitor to achieve resonance at the set operating frequency. The energy is transferred between the resonant antennas.

The power from the receiving antenna is coupled to a receive power converter unit that in a first embodiment (130) integrates an AC-to-AC frequency converter. This operates to create 50 Hz or 60 Hz AC power. This may also adjust and stabilize the voltage to the desired voltage, for example 110 or 220 V AC.

An alternative embodiment, shown in FIG. 2, uses a different style of receive power converter unit 230 which produces for example 12V DC at its output. This may simply use a rectifier and DC-to-DC converter.

Figures 3A, 3B:
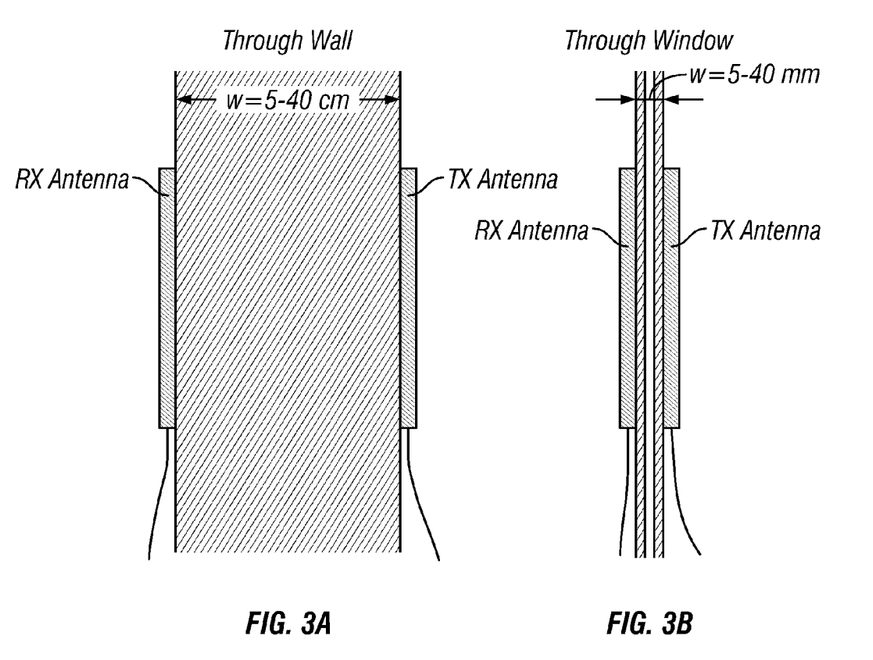
FIG. 3 shows transmission through wall and windows.

FIG. 3A illustrates an arrangement of using the antennas to transfer power through a wall. The wall in FIG. 3A may be for example between 5 and 40 cm (2 to 16 inches).

The coupling factor between the transmitting antenna and receiving antenna may differ significantly for the different materials and thicknesses of the wall. Accordingly, a control system may be used to automatically adapt in order to meet the power requirements of the receive side and to maximize the overall transfer efficiency. FIG. 3B illustrates transmission through a window which is 5 to 40 mm (0.2 to 1.6 inch) in thickness, for example.

Power transfer efficiency can be maximized when the transmit and receive antennas are coaxially positioned, or positioned parallel to one another. FIGS. 3A and 3B show cross-sections in which these antennas are coaxially aligned. In practice, however, this coaxial alignment may be reasonably easy for a transparent barrier such as a window, but may be more difficult for a solid barrier such as a wall. In another embodiment, it may be desirable to change the relative positioning of the antennas so that they are offset from one another, to avoid, for example, mismatching and detuning effects.

An embodiment may use an indicator as part of the transmit power converter unit 101 and/or the receive power converter unit 130 or 230. In a preferred embodiment, that indicator may be part of receive power converter unit 130 or 230. The indicator is shown as 131 in FIG. 2 and FIG. 3. It is controlled by the system that continuously computes transfer efficiency from a set of measurement values provided by sensors inherent to receive power converter unit 130 or 230 and from known system parameters. If the indicator is a light source, the indicator may glow brighter when the system operates more efficiently thus capable to transfer higher power, and less brightly when the transfer efficiency becomes lower thus providing less power transfer capability. This can help define the optimum position of the receive antenna by increasing the brightness of the indicator. A user of the system can move one or the other of the antennas and watch the indicator glow more or less brightly as the antennas move.

Another embodiment can use a numerical display or an analogue indicator dial with an electronically displayed bar or with a mechanical needle and relative numbers. The bar or the needle moves, for example, to show that the antennas are coaxially aligned.

Another embodiment may use an audible tone, for example, that is turned on during a time of antenna alignment, and emits a sound that changes pitch and/or intensity to show alignment of the antennas.

Figure 4:
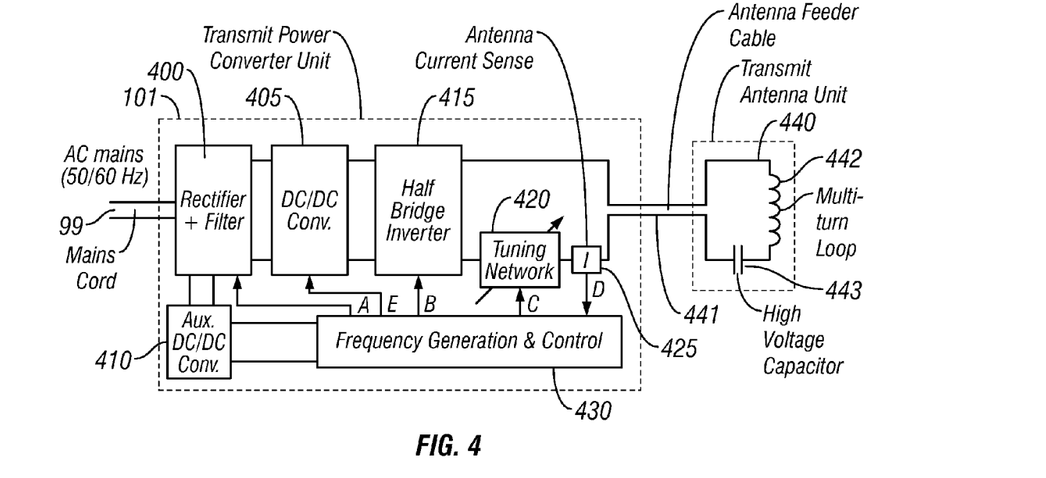
FIG. 4 shows a transmit subsystem.

FIG. 4 illustrates the transmit subsystem including the transmit power converter unit 101. AC power 99 is input to a rectifier and filter 400 which generates a DC voltage to operate the transmit power converter unit 10. A DC-to-DC converter 405 provides power for energizing the power stage here the half bridge inverter 415 and other parts of transmit power converter unit 101. Converter 405 may be a step-down converter that provides an output DC voltage that is lower than the input voltage and that can be controlled for the purpose of power and efficiency control. An auxiliary DC-to-DC converter 410 may also be used to supply another fixed DC voltage for the control systems such as the frequency generation and control unit. A single fixed voltage (e.g., 12 v) may be used for all systems, allowing only a single converter 405 to be used.

Another embodiment may omit the DC-to-DC converter 405. In this case the power stage here the half bridge inverter 415 may be directly supplied from the rectifier and filter 400.

According to a preferred embodiment as disclosed herein, the entire system operates without transformers what principal power conversion concerns. Transformers may be used as part of AC current sensors, in order to reduce the amount of magnetic noise which is present and/or to reduce the weight and/or volume, and/or produce a continuously variable output voltage. As described herein, an embodiment allows all principle power conversion to be carried out by electronic switched-mode power conversion, and it may also include for example charge pumping and the like.

A tuning network 420 may be used to fine tune the resonance frequency of the transmitting antenna system to match the operating frequency in order to maintain the highest possible transfer efficiency.

The antenna current may also be measured by a current sensor 425 that produces an output at interface D. This output may represent both magnitude and phase of the antenna current which may be needed for power and efficiency control.

Frequency generation and control subunit 430 may synchronize and control the operations of the transmit power converter unit 101. In an embodiment, and as shown in FIG. 4, some of a number of different functions are frequency-controlled. The frequency generation and control subunit may generate one or multiple frequencies to control these functions of the transmit power converter unit 101. For example, one or several frequency outputs can be created to respectively control the frequency used by a rectifier/filter 400; frequency used by DC-to-DC converter 405; and a frequency used by an inverter 415. The antenna current measurement output (interface D) can be used by the frequency generation and control unit 430 to optimally adjust resonance frequency of the transmitting antenna.

A transmit power converter unit 101 of a wireless power bridge dimensioned to transfer 100 W may have a rectangular form factor of 3 inches by 6 inches by 1 inch, and look similar to external power supply for a laptop computer.

The power stage that generates the power carrier as used for the wireless power transmission is preferably a half bridge inverter 415. This may use two electronic power switches, for example FETs or transistors in a push pull configuration. The frequency generation and control subunit 430 provides the driving switching waveform via interface B and thereby sets the operating frequency used for wireless power transfer as well as the antenna current. This switching waveform may be adjusted, for example, based on the sensed characteristics of the receive subsystem and its behavioral pattern.

The frequency generation and control subunit 430 may modify parameters to change the DC supply voltage of the power stage, and the duty cycle/pulse width of the switching waveform for the inverter 415. In an embodiment where the DC-to-DC converter is not used, the duty cycle of the switching waveform may be used to change power and transfer efficiency. For example, in one embodiment where a standard AC power frequency is used for wireless power transmission, the power stage can be formed of a phase controlled modulator controlled by the frequency generation and control subunit 430.

The tuning network 420 is used to maintain the resonance frequency of the transmitting antenna at the operating frequency of the wireless power bridge. In a preferred embodiment this operating frequency is fixed and derived from a crystal stabilized oscillator. This method is in contrast to solutions where the transmission frequency is adapted to the resonance frequency of the transmitting antenna. This method herein is considered advantageous to reduce risk of harmful interference to other systems, as well as to achieve regulatory compliance. The tuning network may also compensate for detuning effects and component tolerances (inductor, capacitor, antenna feeder cable, etc.). Detuning effects may be caused by a detuned receiving antenna as well as by extraneous objects in proximity to the transmitting antenna. A reactive component in the source impedance of the power stage may also cause detuning. The tolerances of the components may be attributed to aging of the components as well as fabrication tolerances. The tuning network is controlled by frequency generation and control subunit via the interface C.

The frequency generation and control subunit 430 also generates frequency and switching waveforms to drive the power stage here the half bridge inverter. It also may measure or monitor the transmit antenna current using the current sensed by the current sensing element 425. For example, the control unit 430 can be a processor or microcontroller executing an appropriate algorithm also using prestored data (lookup table). The lookup table may be created by using a defined calibration routine. This algorithm is designed in such a way to converge at maximum transfer efficiency for any coupling factor and—if possible—to meet the required voltage and power at the receive subsystems AC or DC output.

If no receiver can be detected or the coupling to this receiver is too small, the transmit subsystem may automatically enter a stand-by mode where it operates at a reduced power level or with intermittent transmission just sufficient to detect presence of a receiver. Presence detection of a receiver can be accomplished through stimulating and sensing the characteristics of a receiver and its behavioral pattern.

A human interface as part of the transmit power converter unit 101 can also be provided to manually modify certain parameters, for example to manually activate/deactivate the transmit subsystem and to set limits on power transfer.

The transmitting antenna unit 110 is a purely passive device fed over a feeder cable 102 from the transmit power converter unit 101. This feeder cable can be for example 1 m in length and sized to carry voltages and currents at values similar to those used in a standard 110V/220V AC power cord. The transmit antenna itself may include a single or multi-turn loop 442 in series with a high-voltage capacitor 443. This forms an LC tank circuit which is a resonant system tuned to the operating frequency dictated by the transmit power converter unit 101.

The antenna loop is preferably formed of insulated copper wire, having insulation that is sized to withstand the antenna voltage that could occur in a worst-case analysis. In some designs, the RMS voltage of this antenna may be above 1000 V depending on the actual power rating and the maximum transmission distance. Assuming an operating frequency between 20 kHz and 135 kHz, stranded wire with insulated strands, also called "litz wire" may be used to reduce any losses caused by eddy currents such as skin and proximity effects. This may also maximize the unloaded Q factor of the transmitting antenna.

In a similar way, the capacitor may need to withstand RMS voltages greater than 1000 V depending on the system's actual power rating and the maximum transmission distance.

Figure 6:
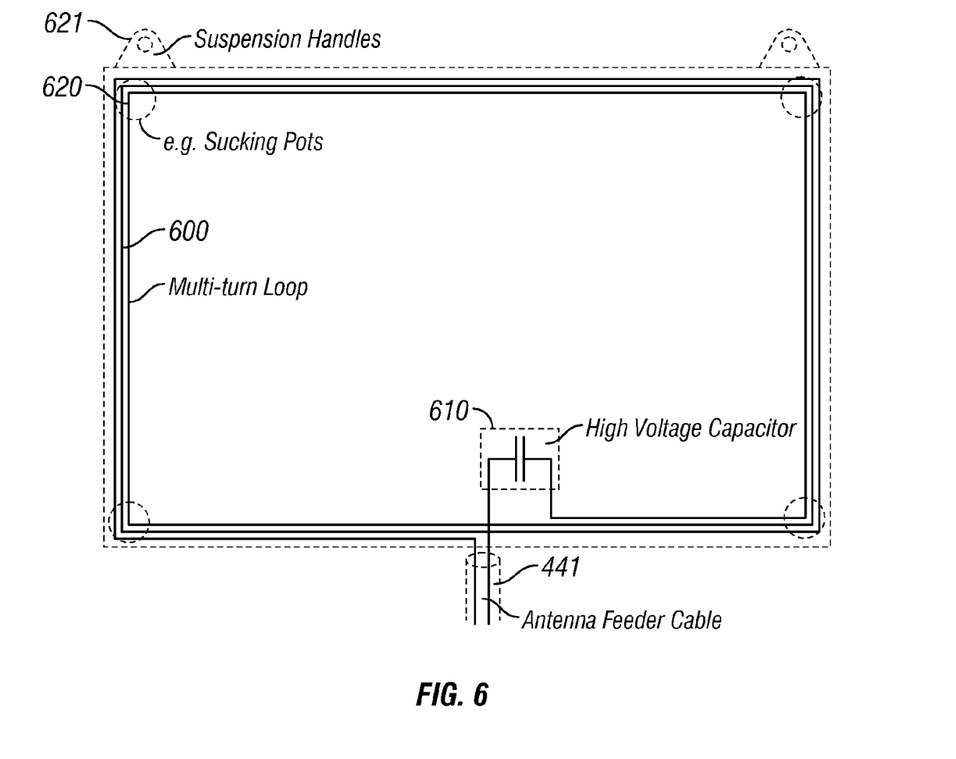
FIG. 6 shows a close-up detail of the antenna.

An antenna embodiment is shown in FIG. 6. A high-voltage capacitor 610 may be mounted in the interior of the loop in order to save space and allow the maximum loop size for a given outer contour form factor. A number of coaxial and insulated antenna loops shown as 600 are fed by the antenna feeder cable 102. A high-voltage capacitor 443 is integrated as part of the antenna unit in a way that allows the high-voltages resulting from resonance with a high Q factor to be maintained on the interior of the antenna, and to appear neither on the feeder cable 102 nor in the transmit power converter unit 101. This may simplify the design and relax certain requirements.

The transmit and the receiving antenna unit may both provide special fixtures that simplify its mounting. Suction cups 620 may be provided for temporary mounting. Suspension handles shown as 621 may be provided for more permanent mounting, or for temporary but recurrent mounting, e.g., on an item that may remain in place most of the time.

Figure 5:
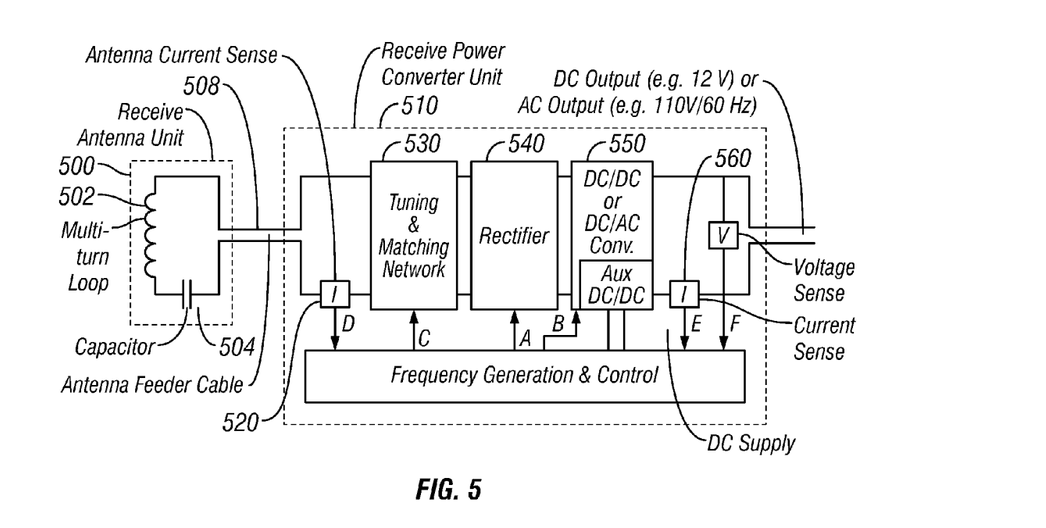
FIG. 5 shows a receive subsystem.

The receive subsystem is shown in detail in FIG. 5. This includes analogous structure to the transmit subsystem of FIG. 4. A receiving antenna unit 120 is formed with a single or multi-turn loop 502 and high voltage capacitor 504. The output from the receiving antenna unit is coupled via an antenna feeder cable 121 that feeds to the receive power converter unit 510. In general, this converter unit may use similar structure as that in FIG. 4, including all or any of an antenna current sense device 510, a tuning and matching network 530, a rectifier 540, DC-to-DC or DC-to-AC converter 550, the auxiliary DC-to-DC converter 551, additional current sense and voltage sense structure 560, and a frequency generation and control subunit 570.

The tuning and matching network 530 may be needed to ensure that receive antenna unit 120 is adjusted for resonance at the transmission frequency and that the rectifiers 540 input impedance is optimally matched to the receive antenna units source impedance 120. The tuning and matching network 530 is controlled by the frequency generation and control subunit 570 via interface C.

The rectifier 540 rectifies and filters the AC voltage as received by receive antenna unit 120 providing the DC required by the following stages. The rectifier 540 may be based on synchronous rectification instead of standard diode circuits in order to minimize power loss in case of low input voltage. The rectifier 540 may be controlled by the frequency generation and control subunit via control interface A.

The DC-to-DC or DC-to-AC converter 550 may be a step-down or step-up converter, respectively, providing an output voltage and current satisfying the requirements of the external load connected to the receive subsystem. In general, the output voltage or current generated by the DC-to-DC or DC-to-AC converter 550 is variable and controlled by the frequency generation and control subunit 570 via control interface B. In another embodiment, this converter 550 may be omitted. That means the external load is directly fed by the rectifier 540. In case the standard AC frequency was directly used for wireless power transmission, the converter 550 may be replaced by a phase controlled modulator.

The additional voltage and current sense 560 are used by the frequency generation and control subunit 570 to maintain the specified DC or AC output voltage and to monitor loading of the receive power converter unit 510.

The frequency generation and control subunit 570 automatically controls and monitors all relevant functions and parameters of the receive subsystem to satisfy voltage and current requirements of the external load and to maximize energy transfer efficiency, and generates all frequency signals and waveforms required to operate the receive power converter unit 510. If needed, it generates the standard AC frequency as required by the external load and feeds this frequency to the DC-to-AC converter 550 via control interface B. Additionally, it measures the antenna current by means of the antenna current sense 520, the DC or AC output voltage and current by means of the voltage and current sense 560, respectively. Based on these measurements, it computes and adjusts the relevant operational parameters and configurations of receive power converter unit 510 in order to satisfy voltage and power demand by the external load and to maximize energy transfer efficiency. The receive subsystems acts independently from the transmit subsystem, trying to satisfy power demand by the external load, whilst optimizing operating parameters at receive side in a manner to converge at maximum transfer efficiency.

In an embodiment, the system is capable of adapting to different levels of coupling factors, between a coupling factor close to 100% or 90% and a minimum coupling factor as low as 1%. This may adjust parts of the circuit automatically, based on these coupling factors.

The receive power converter unit 510 may provide a human interface for activating/deactivating receive power converter unit 510, to manually modify parameters or configurations, and an indicator for optimum positioning of the receive antenna as already described above.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art.

In one embodiment, the inverter may be omitted, and that half bridge inverter 420 will then be directly supplied by the rectifier and filter.

For example, other antenna forms and selections can be used. The term "power" as used herein can refer to any kind of energy, power or force transfer of any type.

The receiving source can be any device that operates from stored energy, including a computer or peripheral, communicator, automobile, or any other device.

Also, the inventors intend that only those claims which use the words "means for" are intended to be interpreted under 35 USC 112, sixth paragraph. Moreover, no limitations from the specification are intended to be read into any claims, unless those limitations are expressly included in the claims.

The operations and/or flowcharts described herein may be carried out on a computer, or manually. If carried out on a computer, the computer may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a handheld computer, such as a PDA, cellphone, or laptop. Moreover, the method steps and operations described herein can be carried out on a dedicated machine that does these functions.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A method of directing power wirelessly through a solid object, comprising:
    generating, by a transmitting antenna, a magnetic field, the transmitting antenna located on one side of a solid object, the solid object comprising a wall or window;
    coupling a receiving antenna to the magnetic field, the receiving antenna located on another side of the solid object;
    producing, by the receiving antenna, an output that includes power transferred from said magnetic field; and
    adjusting a resonant frequency of the transmitting antenna, said adjusting causes an increase in power transfer efficiency between the transmitting antenna and the receiving antenna, said adjusting of the resonant frequency based on a current measurement taken by a sensor.

2. A method as in claim 1, wherein the transmitting antenna and the receiving antenna are each resonant antennas which are tuned at a substantially resonant frequency of the receiving antenna.

3. A method as in claim 1, wherein said solid object cannot be seen through, and further comprising indicating an alignment of said transmitting antenna and said receiving antenna.

4. A method as in claim 1, further comprising:
    receiving, at a transmitting circuit, AC power from an AC power source; and
    converting the power into a form which can be transmitted by said transmitting antenna as a magnetic field.

5. A method as in claim 4, further comprising:
    receiving, at a receiving circuit, power that has been induced into said receiving antenna;
    converting said power into electrical power; and
    coupling said electrical power to a power output jack.

6. A method as in claim 5, wherein said power output jack provides AC power.

7. A method as in claim 4, wherein said power converter in said transmitting circuit operates without transformers.

8. A method as in claim 4, wherein said transmitting circuit includes a control system that senses at least one parameter indicative of power transmission, and produces at least one control signal that can change based on said sensed parameter.

9. A method as in claim 8, wherein said control signal controls operation of at least one element of said transmitting circuit.

10. A method as in claim 8, wherein said transmitting circuit includes at least one power converting element that is driven by at least one frequency from a frequency generation and control unit.

11. A method as in claim 1, further comprising controlling power and increasing transfer efficiency, without an additional communication between the receiving antenna and the transmitting antenna, by stimulating and sensing the characteristics of the receiving antenna and its behavioral pattern.

12. A system for directing power wirelessly through a solid object, comprising:
    a transmitting antenna configured to generate an AC magnetic field;
    a transmitting circuit, coupled to said transmitting antenna, and operative to receive power from an AC connection, and to produce an output power which is coupled to said transmitting antenna and which drives said transmitting antenna in a substantially resonant state;
    a receiving antenna configured to receive power from said AC magnetic field and transmitted by said transmitting antenna across a substantially solid object which is one of a solid wall or window;

a receiving circuit, coupled to receive power transferred at substantial resonance that has been received by said receiving antenna, and to produce an output power based on said receiving of the power by said receiving antenna; and at least one sensor coupled to the transmitting antenna, the sensor configured to produce an output based on a measured current of the transmitting antenna, the output used as a basis for modifying a resonant frequency of the transmitting antenna so as to increase power transfer efficiency between the transmitting antenna and the receiving antenna.

13. A system as in claim 12, wherein at least one of said receiving antenna or said transmitting antenna includes a detection part that detects information indicative of an alignment between said transmitting and receiving antennas.

14. A system as in claim 12, wherein each of said transmitting and receiving antennas has a Q value greater than 200.

15. A system as in claim 12, wherein each of said transmit and receive antennas has wire with an insulation capable of withstanding at least 1000 V.

16. A system as in claim 12, wherein said transmitting circuit further comprises:
an inverter that creates a waveform with a frequency value, said waveform coupled to said transmitting antenna, and
a tuning circuit that changes the resonance frequency of said transmitting antenna.

17. A method as in claim 8, wherein said transmitting circuit includes at least one tuning network, and wherein said tuning network is driven by at least one control signal from a frequency generation and control unit.

18. A system as in claim 12, wherein said receiving circuit comprises a synchronous rectifier to reduce power conversion losses.

19. A wireless power bridge, comprising:
a transmitting unit configured to receive AC power, and to carry out an AC to AC power conversion, the transmitting unit including a transmitting antenna and at least one sensor configured to produce an output based on a measured current of the transmitting antenna;
a resonant transmitting antenna unit, separate from the transmitting unit and coupled to the transmitting unit, said resonant transmitting antenna unit composed of at least one wire loop and a principle capacitor, said resonant transmitting antenna unit including an antenna tuning circuit to tune a resonant frequency of the transmitting antenna based on the output produced by the sensor;
a resonant receiving antenna unit configured to receive power transferred at a substantially resonant frequency of the resonant receiving antenna unit, the resonant receiving antenna unit comprising at least one wire loop and another principle capacitor to achieve the substantially resonant frequency; and
a receiving unit, separate from said resonant receiving antenna unit, and configured to accommodate a received power conversion, the receiving unit comprising an antenna tuning and matching circuit configured to tune a resonance frequency of the resonant receiving antenna unit and to match said received power conversion to a source impedance of said resonant receiving antenna unit.

20. A wireless power bridge as in claim 19, wherein said transmitting unit is configured to control power and increase transfer efficiency without an additional communication between the receiving unit and the transmitting unit, by stimulating and sensing the characteristics of the receiver and its behavioral pattern.

21. A wireless power bridge as in claim 19, wherein said receiving unit is configured to control power and increase transfer efficiency independently of the transmitting unit without additional communication between transmitting unit and receiving unit.

22. A wireless power bridge as in claim 19, wherein said receiving unit includes a synchronous rectifier to reduce power conversion losses.

23. A wireless power bridge as in claim 19, wherein said transmitting unit automatically enters into a stand-by mode when no receiver can be detected, or when coupling to the receiver is below a specified level, wherein while in said stand-by mode, said transmitting unit operates at a reduced power level which is sufficient to detect a presence of a receiver.

24. A wireless power bridge as in claim 19, wherein said transmitting unit detects a presence of a receiver through stimulating and sensing the characteristics of a receiver and its behavioral pattern.

25. A wireless power bridge as in claim 19, wherein said transmitting unit uses a fixed frequency for wireless power transfer derived from a crystal stabilized oscillator.

26. A wireless power bridge as in claim 19, wherein said antennas are coupled via a double wire power cord.

27. A method of directing power wirelessly through a solid object, comprising:
applying power from an AC outlet to a power transmitting device on a first side of a solid object, where the solid object is an object from the group comprising of a solid wall or a solid window;
wirelessly transmitting a magnetic signal from said power transmitting device;
receiving said magnetic signal on a second side of the solid object;
creating power output on the second side of the solid object, in a power receiving device, based on the wirelessly transmitted power transferred at substantial resonance; and
adjusting a resonant frequency of the first power transmitting device, said adjusting causes an increase in power transfer efficiency between the power transmitting device and the power receiving device, said adjusting of the resonant frequency based on a current measurement taken by a sensor.

28. A method as in claim 27, further comprising a first part in said power transmitting device, and a second part in second power receiving device, wherein an efficiency of power transmission depends on alignment between said first and second parts.

29. A method as in claim 28, wherein said solid object cannot be seen through, the method further comprising indicating an alignment of said first part and said second part.

30. A method of directing power wirelessly through a solid object, comprising: generating, by a transmitting antenna, a magnetic field, the transmitting antenna located on one side of a solid object;
coupling, by a receiving antenna, to the magnetic field, the receiving antenna located on another side of the solid object;
producing, by the receiving antenna, an output that includes power transferred from said magnetic field; and
adjusting a resonant frequency of the transmitting antenna, said adjusting causes an increase in power transfer efficiency between the transmitting antenna and the receiving antenna, said adjusting of the resonant frequency based on a current measurement taken by a sensor.

31. A method as in claim 30, wherein the transmitting antenna and the receiving antenna are each resonant antennas which are tuned at a substantially resonant frequency of the receiving antenna.

32. A method as in claim 30, wherein said solid object cannot be seen through, and further comprising indicating an alignment of said transmitting antenna and said receiving antenna.

33. A method as in claim 30, further comprising:
receiving, at a transmitting circuit, AC power from an AC power source; and
converting the received AC power into a form which can be transmitted by said transmitting antenna as a magnetic field.

34. A method as in claim 33, further comprising:
receiving, at a receiving circuit, power that has been induced into said receiving antenna;
converting said power into electrical power; and
coupling said electrical power to a power output jack.

35. A method as in claim 34, wherein said power output jack provides AC power.

36. A method as in claim 35, wherein said power converter in said transmitting circuit operates without transformers.

37. A method as in claim 33, wherein said transmitting circuit includes a control system that senses at least one parameter indicative of power transmission, and produces at least one control signal that can change based on said sensed parameter.

38. A method as in claim 37, wherein said control signal controls operation of at least one element of said transmitting circuit.

39. A method as in claim 37, wherein said transmitting circuit includes at least one power converting element that is driven by at least one frequency from said frequency generation and control unit.

40. A method of directing power wirelessly through a solid object, comprising:
applying power from an AC outlet to a power transmitting device on a first side of a solid object;
wirelessly transmitting a magnetic signal from said power transmitting device;
receiving said magnetic signal on a second side of the solid object;
creating power output on the second side of the solid object, in a power receiving device, based on the wirelessly transmitted magnetic signal being transferred at substantial resonance; and
adjusting a resonant frequency of the power transmitting device, said adjusting causes an increase in power transfer efficiency between the power transmitting device and the power receiving device, said adjusting of the resonant frequency based on a current measurement taken by a sensor.

41. A method as in claim 40, further comprising a first part in said power transmitting device, and a second part in said power receiving device, wherein an efficiency of power transmission depends on alignment between said first and second parts.

42. A method as in claim 41, wherein said solid object cannot be seen through, and further comprising indicating an alignment of said first part and said second part.

43. A system for directing power wirelessly through a solid object, comprising:
a transmitting antenna configured to generate a magnetic field from an AC connection;
a transmitting circuit, coupled to said transmitting antenna, and operative to receive power from the AC connection, and to produce output power which is coupled to said transmitting antenna and which drives said transmitting antenna to create AC power wirelessly in a receiving antenna configured to receive power from said magnetic field; and
at least one sensor coupled to the transmitting antenna, the at least one sensor configured to produce an output based on a measured current of the transmitting antenna, the output used as a basis for modifying a resonant frequency of the transmitting antenna so as to increase power transfer efficiency between the transmitting antenna and the receiving antenna.

44. A system for directing power wirelessly through a solid object, comprising:
a receiving antenna configured to receive power from magnetic field transmitted by a transmitting antenna that has been created from an AC connection, said receiving antenna adapted for mounting adjacent to a solid object, with said solid object located between said receiving antenna and said transmitting antenna;
a receiving circuit, coupled to receive power transferred at substantial resonance that has been received by said receiving antenna, and to produce output AC power based on said receiving by said receiving antenna; and
at least one sensor coupled to the receiving antenna, the at least one sensor configured to produce an output based on a measured current of the receiving antenna, the output used as a basis for modifying a resonant frequency of the receiving antenna so as to increase power transfer efficiency between the transmitting antenna and the receiving antenna.

45. A method of directing power wirelessly through a solid object, comprising:
generating, by a transmitting antenna, a magnetic field from an AC connection;
receiving, by a transmitting circuit coupled to said transmitting antenna, power from the AC connection;
producing, by the transmitting circuit, output power which is coupled to said transmitting antenna and which drives said transmitting antenna to create AC power wirelessly in a receiving antenna configured to receive power from said magnetic field; and
producing, by at least one sensor coupled to the transmitting antenna, an output based on a measured current of the transmitting antenna, the output used as a basis for modifying a resonant frequency of the transmitting antenna so as to increase power transfer efficiency between the transmitting antenna and the receiving antenna.

46. An apparatus for directing power wirelessly through a solid object, comprising:
means for generating magnetic field from an AC connection;
means for receiving power from the AC connection, the means for receiving comprising means for producing output power which is coupled to said means for generating and which drives said means for generating to create AC power wirelessly in a receiving antenna configured to receive power from said magnetic field; and
means for producing an output based on a measured current of the means for generating, the output used as a basis for modifying a resonant frequency of the means for generating so as to increase power transfer efficiency between the means for generating and the receiving antenna.

47. A method of directing power wirelessly through a solid object, comprising:

receiving, by a receiving antenna, power from a magnetic field transmitted by a transmitting antenna that has been created from an AC connection, said receiving antenna adapted for mounting adjacent to a solid object, said received power transferred at substantial resonance;

receiving, by a receiving circuit, said received power from the receiving antenna;

producing, by the receiving circuit, output AC power based on said received power; and producing, by at least one sensor coupled to the receiving antenna, an output based on a measured current of the receiving antenna, the output used as a basis for modifying a resonant frequency of the receiving antenna so as to increase power transfer efficiency between the transmitting antenna and the receiving antenna.

48. An apparatus for directing power wirelessly through a solid object, comprising:

first means for receiving power from a magnetic field transmitted by a transmitting antenna that has been created from an AC connection, said first means adapted for mounting adjacent to a solid object, said received power transferred at substantial resonance;

second means for receiving said received power from the first means, said second means comprising means for producing output AC power based on said received power; and means for producing an output based on a measured current of the first means, the output used as a basis for modifying a resonant frequency of the first means so as to increase power transfer efficiency between the transmitting antenna and the first means.

* * * * *